(12) United States Patent
Hatch

(10) Patent No.: US 6,934,632 B2
(45) Date of Patent: Aug. 23, 2005

(54) METHOD FOR USING THREE GPS FREQUENCIES TO RESOLVE CARRIER-PHASE INTEGER AMBIGUITIES

(75) Inventor: Ronald R. Hatch, Wilmington, CA (US)

(73) Assignee: NavCom Technology, Inc., Torrance, CA (US)

( * ) Notice: Subject to any disclaimer, the term of this patent is extended or adjusted under 35 U.S.C. 154(b) by 0 days.

(21) Appl. No.: 10/682,553

(22) Filed: Oct. 8, 2003

(65) Prior Publication Data

US 2005/0080560 A1 Apr. 14, 2005

(51) Int. Cl.$^7$ ............................................. G01C 21/00
(52) U.S. Cl. ..................................................... 701/213
(58) Field of Search ............................... 701/213–215; 342/357.01, 357.02, 357.03, 357.04, 357.06

(56) References Cited

U.S. PATENT DOCUMENTS

| | | | | | |
|---|---|---|---|---|---|
| 5,148,179 | A | * | 9/1992 | Allison .................. | 342/357.03 |
| 5,359,332 | A | * | 10/1994 | Allison et al. ......... | 342/357.04 |
| 5,903,654 | A | * | 5/1999 | Milton et al. .......... | 342/357.02 |

OTHER PUBLICATIONS

Yanming Feng et al., "A Long Range Dynamic GPS Positioning System and its Test Results", Position Location and Navigation Symposium 1996, IEEE, Atlanta, GA, Apr. 1996, pp. 711–717.
Colombo et al., "Resolving Carrier–Phase Ambiguities on the Fly, At More Than 100 km From Nearest Reference Site, With the Help of Ionospheric Tomography", ION GPS '99, Nashville, TN, Sep. 14–17, 1999, pp. 1635–1642.
Colombo et al., "Ionospheric Tomography Helps Resolve GPS Ambiguities on the Fly at Distances of Hundreds of Kilometers During Increased Geomagnetic Activity", Presented at the IEEE "PLANS 2000" Meeting, San Diego, Mar. 13–16, 2000.
Ericson, Swen "A Study of Linear Phase Combinations in Considering Future Civil GPS Frequencies", ION NTM, 1999, pp. 677–686.
Forsell et al., "Carrier Phase Ambiguity Resolution in GNSS–2", ION GPS, 1997, pp. 1727–1736.
Han et al., "The Impact of Two Additional Civilian GPS Frequencies on Ambiguity Resolution Strategies", ION 55$^{th}$ Annual Meeting, Cambridge, MA, Jun. 28–30, 1999, pp. 315–321.
Hatch, Ronald R., "The Promise of a Third Frequency", GPS World, May 1996, pp. 55–58.
Hatch et al., "Civilian GPS: The Benefits of Three Frequencies", GPS Solutions, vol. 3, No. 4, 2000, pp. 1–9.

(Continued)

Primary Examiner—Yonel Beaulieu
(74) Attorney, Agent, or Firm—Morgan, Lewis & Bockius LLP

(57) ABSTRACT

A method for generating an ambiguity-resolved, refraction-corrected, and noise-minimized carrier-phase measurement. The method includes forming a first composite measurement using GPS carrier-phase measurements on the L1, L2 and L5 frequencies. To reduce the noise in the first composite measurement, the method further includes forming a second composite measurement using GPS carrier-phase measurements on at least two of the three GPS carrier frequencies. The second composite measurement is formed to have a small multi-path noise therein so that it can be used to smooth the first composite measurement so that the multi-path noise is minimized.

20 Claims, 3 Drawing Sheets

OTHER PUBLICATIONS

Isshiki, Hiroshi "An Application of Wide–Lane to Long Baseline GPS Measurements (3)", ION GPS, 2003.

Jung, Jaewoo "Optimization of Cascade Integer Resolution with Three Civil GPS Frequencies"; ION GPS 2000, Salt Lake City, UT, Sep. 19–22, 2000, pp. 2191–2200.

Martinez–Bonillo et al., "The Benefits of the GPS Three Frequencies on the Ambiguity Resolution Techniques", ION GPS '99, Nashville, TN, Sep. 14–17, 1999, pp. 1737–1746.

Pajares–Hernandez et al., "Impact of Real–Time Ionospheric Determination on Improving Precise Navigation with GALILEO and Next–Generation GPS", ION GPS 2002, Portland, OR, Sep. 24–27, 2002, pp. 2756–2767.

Raquet et al., "Long Distance Kinematic Carrier–Phase Ambiguity Resolution Using a Simulated Reference Receiver Network", ION GPS–97, Kansas City, Missouri, Sep. 1997, pp. 1–10.

Sinko, James "A Compact Earth Tides Algorithm for WADGPS", ION GPS—1995, pp. 35–44.

Teunissen et al., "A Comparison of TCAR, CIR and Lambda GNSS Ambiguity Resolution", ION GPS 2002, Portland, OR, Sep. 24–27, 2002, pp. 2799–2808.

Vollath et al., "Analysis of Three–Carrier Amgibuity Resolution (TCAR) Technique for Precise Relative Positioning in GNSS–2", ION GPS, 1998, pp. 417–426.

Werner, et al., "Performance of the TCAR Method in Multipath and Jamming Environments", ION GPS, 1998, pp. 1385–1394.

* cited by examiner

METHOD FOR USING THREE GPS FREQUENCIES TO RESOLVE CARRIER-PHASE INTEGER AMBIGUITIES

The present invention relates generally to technologies associated with positioning systems, such as the Global Positioning System (GPS) or the European Galileo System, and more particularly to methods of resolving integer ambiguities in carrier-phase measurements in the position systems.

BACKGROUND

A wide-area positioning system, such as the global positioning system (GPS), uses a constellation of satellites to position or navigate objects on earth. Currently, the constellation of satellites broadcast signals at two carrier frequencies, L1 frequency at (154*10.23 MHz) or 1572.45 MHz and L2 frequency at (120*10.23 MHz) or 1227.6 MHz, or L1 wavelength of 0.1903 m and L2 wavelength of 0.2442 m, respectively. For each carrier frequency, two types of GPS measurements are usually made by a GPS receiver with an object to be positioned. The two types of GPS measurements are pseudorange measurement, and integrated carrier phase measurement. The pseudorange measurement (or code measurement) is a basic GPS observable that all types of GPS receivers can make. It utilizes the C/A or P codes modulated onto the carrier signals. The carrier phase measurement is obtained by integrating a reconstructed carrier of the signal as it arrives at the receiver. Because of an unknown number of whole cycles in transit between the satellite and the receiver when the receiver starts tracking the carrier phase of the signal, there is a whole-cycle ambiguity in the carrier phase measurement. This whole-cycle ambiguity must be resolved in order to achieve high accuracy in the carrier-phase measurement.

With the GPS measurements available, the range or distance between a GPS receiver and each of a plurality of satellites is calculated by multiplying a signal's travel time by the speed of light. These ranges are usually referred to as pseudoranges (false ranges) because the GPS measurements may include errors due to various error factors, such as satellite clock timing error, ephemeris error, ionospheric and tropospheric refraction effects, receiver tracking noise and multipath error, etc. To eliminate or reduce these errors, differential operations are typically used in GPS applications. Differential GPS (DGPS) operations typically involve a base reference GPS receiver, a user GPS receiver, and a communication mechanism between the user and reference receivers. The reference receiver is placed at a known location and the known position is used to generate corrections associated with some or all of the above error factors. The corrections generated or raw date measured at the reference station are supplied to the user receiver, which then uses the corrections or raw data to appropriately correct its computed position. Differential operations using carrier-phase measurements are often referred to as real-time kinematic (RTK) positioning/navigation operations.

The corrections generated or raw data measured at the reference receiver, however, are useful at the user GPS receiver only when there are spatial and temporal correlations of the errors between reference receiver and the user receiver. While the GPS satellite clock timing error, which appears as a bias on the pseudorange or carrier phase measurement, is perfectly correlated between the reference receiver and the user receiver, most of the other error factors are either not correlated or the correlation diminishes in wide-area applications, i.e., when the distance between the reference and user receivers becomes large. Moreover, when the distance between the user receiver and the reference receiver becomes large, such as more than about 10 to 20 kilometers, the two carrier frequencies in the existing GPS system are inadequate to resolve the whole-cycle carrier-phase ambiguities.

SUMMARY

The present invention includes a method for generating an ambiguity-resolved, refraction-corrected, and noise-minimized carrier-phase measurement. In one embodiment, to form the ambiguity-resolved, refraction-corrected, and noise-minimized carrier-phase measurement, a first composite measurement is formed using GPS carrier-phase measurements on the L1, L2 and L5 frequencies. The first composite measurement is a linear combination of the GPS carrier-phase measurements on the three GPS carrier frequencies. It is ambiguity-resolved and refraction-corrected, but it may have relatively large multipath noise. To reduce the noise in the first composite measurement, a second composite measurement is formed using GPS carrier-phase measurements on at least two of the three GPS carrier frequencies. The second composite measurement is formed to have a small multi-path noise therein so that it can be used to smooth the first composite measurement.

In one embodiment, to smooth the first composite measurement with the second composite measurement, an offset between the first composite measurement and the second composite measurement at each of a plurality of measurement epochs is computed and the offset is smoothed in an expanding average over the plurality of measurement epochs. The smoothed offset is added to the second composite measurement to obtain the ambiguity-resolved, refraction-corrected, and noise minimized GPS carrier-phase measurement.

The ability to resolve the ambiguities of refraction-corrected, composite measurements will largely remove baseline separation limitations in the use of carrier-phase Differential GPS, so that a global RTK capability becomes feasible.

DETAILED DESCRIPTION

Figure 1:
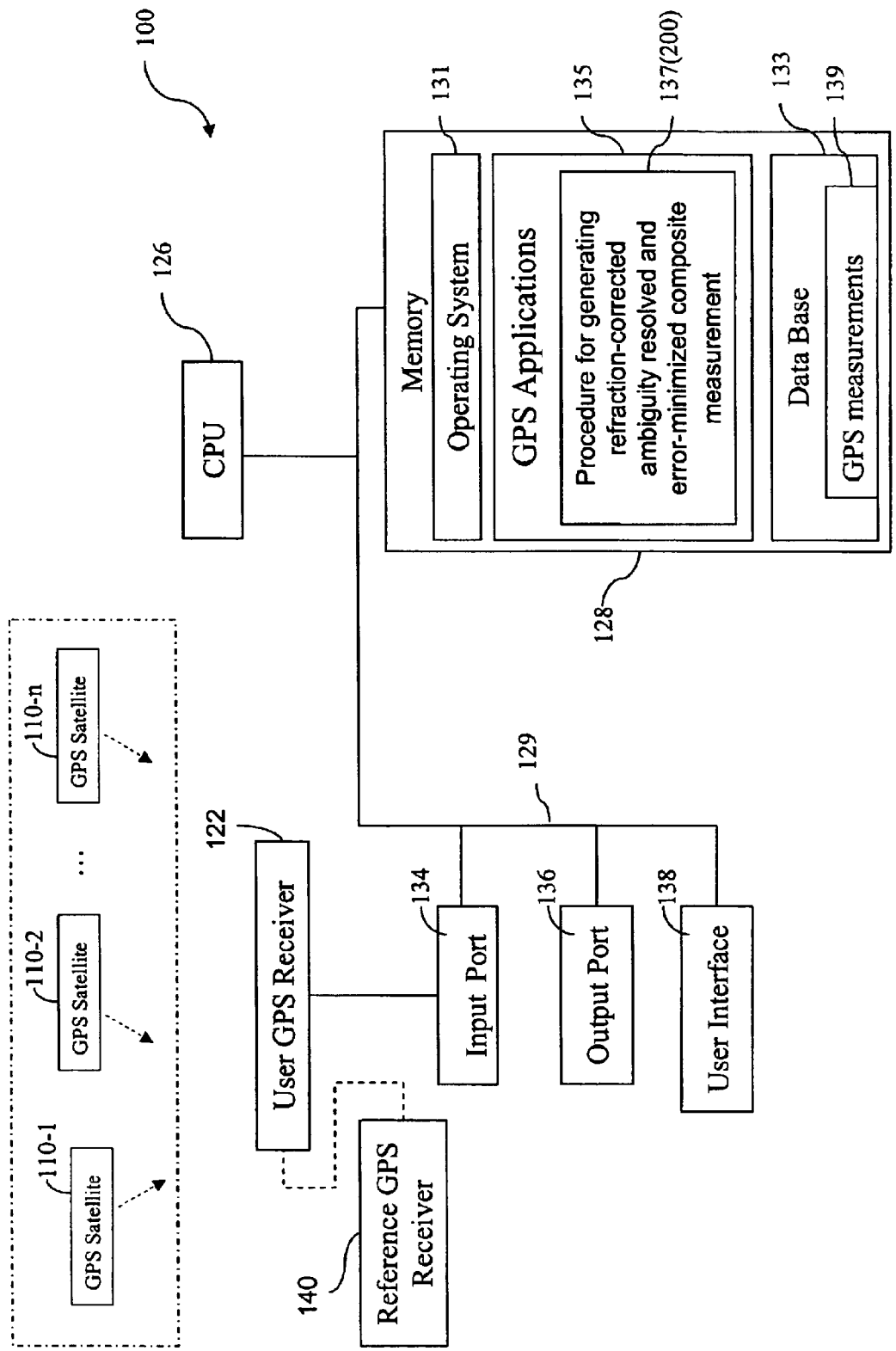
FIG. 1 is a block diagram of a computer system that can be used to carry out the method for generating an ambiguity-resolved, refraction-corrected, and noise-minimized carrier-phase measurement.

FIG. 1 illustrates a computer system 100 that can be used to carry out a method for generating an ambiguity-resolved, refraction-corrected, and noise-minimized composite carrier-phase measurement, according to one embodiment of the present invention. The computer system 100 is coupled to a user GPS receiver 122 which supplies to the computer system 100 GPS code and carrier-phase measurements based on signals from a plurality of satellites 110-1, 110-2, . . . , 110-n, where n is the number of satellites in view of the user GPS receiver 122. The user GPS receiver 100 may be in communication with a reference GPS receiver 140 also taking measurements based on signals from the plurality of satellites, which are used to generate corrections to the GPS measurements taken at the user GPS receiver. The plurality of satellites, or any one or more of them, are sometimes referred to hereafter in this document as satellite(s) 110. In some embodiments, the user GPS receiver 122 and the computer system 100 are integrated into a single device, within a single housing, such as a portable, handheld or even wearable position tracking device, or a vehicle-mounted or otherwise mobile positioning and/or navigation system. In other embodiments, the user GPS receiver 122 and the computer system 100 are not integrated into a single device.

As shown in FIG. 1, the computer system 100 includes a central processing unit (CPU) 126, memory 128, an input port 134 and an output port 136, and (optionally) a user interface 138, coupled to each other by one or more communication buses 129. The memory 128 may include high-speed random access memory and may include nonvolatile mass storage, such as one or more magnetic disk storage devices. The memory 128 preferably stores an operating system 131, a database 133, and GPS application procedures 135. The GPS application procedures may include procedures 137 for implementing the method for generating an ambiguity-resolved, refraction-corrected, and noise-minimized composite carrier-phase measurement, according to one embodiment of the present invention, as described in more detail below. The operating system 131 and application programs and procedures 135 and 137 stored in memory 128 are for execution by the CPU 126 of the computer system 124. The memory 128 preferably also stores data structures used during execution of the GPS application procedures 135 and 137, including GPS pseudorange and/or carrier-phase measurements 139, as well as other data structures discussed in this document.

The input port 134 is for receiving data from the GPS receiver 122, and output port 136 is used for outputting data and/or calculation results. Data and calculation results may also be shown on a display device of the user interface 138.

Two principal techniques have been developed to resolve the whole-cycle carrier-phase ambiguities. The first technique is often referred to as the "geometry-free" or measurement-space" technique and uses smoothed code measurements to determine the whole-cycle ambiguities of the carrier-phase measurements. The second technique is often referred to as the "geometry-dependent" or "position-space" technique and uses a search process to determine which combination of whole-cycle ambiguities with respect to a plurality of satellites in view of the GPS receiver gives the "best" solution according to some criteria, such as a minimum of the sum of the squares of measurement residuals.

There are several advantages of using the geometry-free approach for the carrier-phase ambiguity resolution. A first advantage for the geometry-free approach is that it is less affected by errors in the GPS measurements caused by the tropospheric refraction effects because the code and carrier-phase measurements are equally affected by the troposphere. A second advantage for the geometry-free approach is that the ambiguity resolution is done on a satellite by satellite basis, as compared with the geometry-dependent approach, which needs at least five satellites in view of the GPS receiver in order to insure the correctness of the solution. A third advantage for the geometry-free approach is that movement of the user GPS receiver has no effect on the difference of the code and carrier-phase measurements, while the geometry-dependent approach may need to propagate the position of the user GPS receiver forward in time when the user is moving. Also, because the geometry-free approach uses a greater degree-of-freedom than the geometry-dependent approach, it is simpler to verify that a correct resolution of the whole-cycle ambiguities is made in the case of the geometry-free approach. These advantages make the geometry-free approach more favorable for RTK applications.

With the two existing L1 and L2 carrier frequencies, the geometry-free technique is used to resolve the whole-cycle ambiguities in a cascaded manner, in which whole cycle ambiguities are resolved first for wide-lane measurement combinations having a longest wavelength. A most often used wide-lane combination is a simple difference of the carrier-phase measurements on the existing two frequencies, L1 and L2, which is referred to hereafter as the (L1–L2) measurement difference. The (L1–L2) measurement difference has an 86.2 centimeter wavelength and is well suited for whole-cycle ambiguity resolution. The whole cycle ambiguity in the (L1–L2) measurement difference can be resolved by using a frequency weighted average of the code measurements on the two frequencies, which matches the ionospheric distortion in the carrier-phase measurement difference. The resolved wide-lane whole-cycle ambiguities are then used to step successively to smaller (narrow-lane) wavelengths. This approach, however, only works when the distance between the reference receiver and the user receiver (baseline separation) does not exceed a certain limit, such as 10 to 20 kilometers.

The source of the problem is the diverging effect of the ionosphere upon the two carrier frequencies when the baseline separation becomes large. The (L1–L2) measurement difference is adversely affected by ionospheric refraction effects. The magnitude of the ionospheric refraction effect on the measurement difference is about the average of the effect on the two individual L1 and L2 measurements, but is of opposite sign. Although the whole cycle ambiguity in the (L1–L2) measurement difference can be resolved over large distances, in order to remove the ionospheric refraction effect in the measurement difference, the whole-cycle ambiguity in some other measurement combination with a different dependence on the ionosphere must also be resolved. A measurement combination, or a composite measurement, is a combination of carrier-phase measurements on different carrier frequencies.

With just two carrier frequencies, it is very difficult to resolve the whole-cycle ambiguities on any other combinations of the carrier-phase measurements when the baseline separation is large. Without a third frequency, a best combination that has very little distortion induced by ionospheric refraction is a composite measurement formed using the difference between nine times the L1 carrier-phase measurement and seven times the L2 carrier-phase measurement, which is referred to as the (9L1–7L2) composite measurement. But this composite measurement has two very adverse characteristics. First the effective wavelength of the composite measurement is only 5.35 centimeters. The knowledge of the ambiguity value for the (L1–L2) measurement combination (whether it is even or odd) can be used to increase the effective wavelength from 5.37 to 10.7 centimeters. But it is still impossible to resolve the refraction corrected ambiguity over long baselines because of the adverse multiplication of the multipath noise in the refraction correction process.

As part of the modernization of GPS, a new signal with a third frequency will be made available to civilian users.

This new signal is sometimes labeled as the L5 signal for historical reasons and has a frequency of (115*10.23 MHz) or 1176.45 MHz, or a wavelength of 0.2548 m. The proposed addition of the third frequency to the GPS broadcast signals provides an additional degree of freedom in constructing composite measurements with varying wavelengths, varying sensitivity to the ionosphere, and different noise amplification effects, and thus can be helpful in obtaining ambiguity-resolved and refraction-corrected carrier-phase measurements, which are crucial to high-precision GPS applications.

Figure 2:
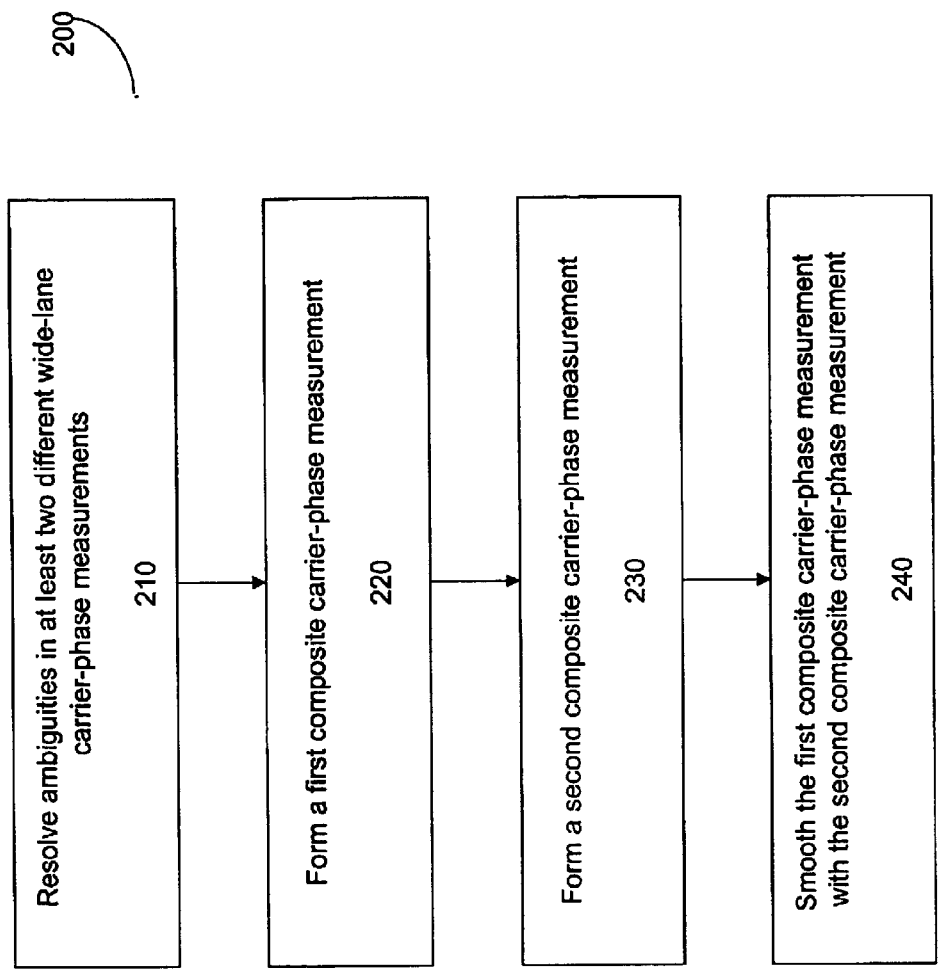
FIG. 2 is a flowchart illustrating the method for generating an ambiguity-resolved, refraction-corrected, and noise-minimized carrier-phase measurement.

FIG. 2 illustrates a method 200 for generating an ambiguity-resolved, refraction-corrected, and noise-minimized composite carrier-phase measurement, according to one embodiment of the present invention. As shown in FIG. 2, method 200 includes step 210 in which ambiguities are resolved in at least two wide-lane measurements each formed using the difference between carrier-phase measurements taken at two of the three frequencies. As indicated above, the frequency-weighted average of the L1 and L2 code measurements match the ionospheric refraction of the (L1–L2) carrier-phase measurement difference, and so can be used to resolve the ambiguity in the (L1–L2) carrier-phase measurement difference independent of ionospheric disturbance in the measurements. In similar fashion, the ambiguities in the (L1–L5) and (L2–L5) carrier-phase measurement difference can also be determined. The general relationship for resolving these wide-lane ambiguities using the frequency-weighted average of the corresponding code measurements is $$N_{ij} = \left(\frac{f_i P_i + f_j P_j}{f_i + f_j}\right) \frac{(f_i - f_j)}{c} - (\phi_i - \phi_j) \quad (1)$$

where i, j=1, 2, or 5, represent two different carrier frequencies Li, Lj, respectively, $f_i$ and $f_j$ represent the magnitudes of the Li and Lj frequencies, respectively, Pi and Pj represent the code measurement at the Li and Lj frequencies, respectively, $\phi_i$ and $\phi_j$ represent the carrier-phase measurement at the Li and Lj frequencies, respectively, c is the speed of light, and $N_{ij}$ represents the carrier-phase whole-cycle ambiguity for the ($L_i$–$L_j$) carrier-phase measurement difference and is rounded to the nearest integer value. Both the code and the carrier-phase measurements in Equation (1) are assumed to have been corrected using the measurements taken at the reference receiver.

Therefore, the wide-lane ambiguities for the (L1–L2), (L1–L5), and (L2–L5) carrier-phase measurement differences can be resolved using Equation (1). Actually, because of the frequency relationships, once the ambiguities on any two of these measurement differences are determined, the ambiguity in the third measurement difference can be directly determined. A problem still exists, however, when one tries to remove the distortion due to the ionosphere from these measurement differences. Because the L2 and L5 frequencies are so close together, taking a difference of the carrier-phase measurements on the two frequencies results in a large multipath noise in the measurement difference. After ionospheric correction, the multipath noise would be further amplified. So it is impractical to use the (L2–L5) measurement difference to resolve the L1, L2, or L5 narrow-lane carrier-phase measurements directly. Without the use of (L2–L5) measurement difference, the (L1–L2) and (L1–L5) measurement difference are so close in value that a large multiple is required to map the difference into a correction of the L1, L2, or L3 measurement. This again amplifies the multipath noise to an unacceptable level.

Thus, method 200 further includes step 220 in which a composite measurement having a negligible refraction error is formed using the carrier-phase measurements taken at all of the three frequencies. In one embodiment of the present invention, this composite measurement is a linear combination of the carrier-phase measurements on the three frequencies, and more preferably a super combination of at least two ambiguity-resolved wide-lane measurements. The absence of refraction error in the composite measurement is a result of the refraction errors in the carrier-phase measurements on the three frequencies canceling each other when forming the composite measurement, or the result of the refraction errors in the wide-lane measurements canceling each other when forming the super combination. For example, the refraction correction can be obtained by subtracting from the (L1–L2) wide-lane measurement a multiple of the (L2–L5) wide-lane measurement, so that the ionospheric refraction error in the multiple of the (L2–L5) wide-lane measurement cancels out the ionospheric refraction error in the (L1–L2) carrier phase measurement. The equation for calculating a factor for the multiple is:

$$\frac{f_5(f_1 - f_2)}{f_1(f_2 - f_5)} = 5.077922078$$

Since the ambiguities in the (L1–L2), the (L1–L5), and the (L2–L5) carrier-phase measurement differences have been resolved in step 210, as discussed above, we can get a refraction corrected and ambiguity resolved composite measurement in step 220 by computing:

$$\phi_r = (\phi_1 - \phi_2 + N_{12}) - 5.077923(\phi_2 - \phi_5 + N_{25}) \quad (2)$$

where $\phi_r$ represents the composite measurement, $\phi_1$, $\phi_2$, and $\phi_5$ represent the carrier-phase measurement at the L1, L2, and L5 frequencies, respectively, all assumed to have been corrected using measurements taken at the reference GPS receiver 140, $N_{12}$ is the ambiguity in the (L1–L2) carrier-phase measurement difference, and $N_{25}$ is the ambiguity in the (L2–L5) carrier-phase measurement difference.

Approximately, the super combination in Equation (2) can be viewed as a linear combination of the carrier-phase measurements on the three frequencies formed by taking the carrier-phase measurement on the L1 frequency plus 5-times the carrier-phase measurement on the L5 frequency and minus six-times the carrier-phase measurement on the L2 frequency, e.g., the composite measurement of (L1–6L2+5L5). The composite measurement of (L1–6L2+5L5) has very little ionospheric refraction error compared to the refraction error in the L1 carrier-phase measurement. Specifically, the effect of the ionosphere on the (L1–6L2+5L5) composite measurement is only 7.44% of the effect of the ionosphere on the L1 measurement. It is noted that the (L1–6L2+5L5) composite measurement is also equivalent to a super combination of the (L1–L5) measurement difference reduced by six times the (L2–L5) measurement difference, i.e., $$(L1-6L2+5L5)=(L1-L5)-6(L2-L5).$$

The refraction corrected and ambiguity resolved carrier-phase composite measurement in Equation (2) has a wavelength of 3.4035 meters which can be used to scale the composite measurement to a measured pseudorange with respect to a satellite. There remains, however one adverse characteristic about this composite measurement. Specifically, the phase noise of the individual carrier-phase measurements has been increased substantially by the multiplication and by the increased wavelength. Assuming that the phase noise is equal on the three frequencies and equivalent to 1 centimeter at the L1 frequency, then the noise in the refraction corrected and ambiguity resolved composite measurement $\phi_r$ will be about 143 centimeters. The assumption of equal phase noise is not critical. For example, an alternate assumption that the phase noise in L1 is equal to one centimeter and the phase noise in each of the other two frequencies is scaled by the wavelength of the frequency would yield a slightly smaller value of 110 centimeters for the noise in the composite measurement.

Though this noise in the refraction corrected composite measurement $\phi_r$ of Equation (2) seems somewhat large, it compares favorably with the noise that results from using the code measurements to obtain a refraction-corrected result. It is undoubtedly better than the code measurements, in that the phase measurements are less subject to the biases which can result from various sources, i.e. receiver design characteristics. Further, even though the wavelength is large, the measurement is insensitive to phase windup because of an equal amount of positive and negative phase measurements in the composite. Most of the noise in the composite phase measurement results from the multipath present in the individual phase measurements. Fortunately, the same method previously employed to smooth out the multipath in the code measurements can be used to smooth out the phase multipath noise.

Therefore, method 200 further includes step 230 in which another composite carrier-phase measurement having a small noise amplification is formed and step 240 in which the ambiguity resolved carrier-phase measurement of equation (2) is smoothed with the other composite carrier-phase measurement with a small noise amplification. A specific example of a composite measurement that has close to a minimum noise amplification is given by:

$$\phi_m = 4.219178\phi_1 - 1.609589(\phi_2 + \phi_5) \quad (3)$$

where $\phi_m$ represents the composite measurement.

The numerical values 4.219178 and 1.609589 in equation (3) are obtained from the more general equation:

$$\phi_m = \frac{f_1}{f_1 - 0.5(f_2 + f_5)}\phi_1 - .5\frac{0.5(f_2 + f_5)}{f_1 - 0.5(f_2 + f_5)}(\phi_2 + \phi_5). \quad (4)$$

The composite measurement $\phi_m$ has a wavelength of approximately 10.8 centimeters and would have a noise level of about 2.7 centimeters assuming the same equal phase noise on each frequency as was assumed above. Equation (3) or (4) is not very sensitive to trade-offs between the L2 and L1 measurements, and because no ambiguities are being resolved, any multiple of this equation should work just as well for the purposes discussed below. Thus cutting the coefficients in equation (3) in half and using twice the wavelength to scale the composite measurement to meters will give exactly the same composite measurement with exactly the same noise in the measured value. Although $\phi_m$ has been formed using the carrier-phase measurements from three frequencies, one can also form a refraction-corrected composite measurement that has slightly higher noise amplification than $\phi_m$ by using only the L1 and L2 carrier-phase measurements or only the L1 and L5 carrier-phase measurements.

For optimum results, the composite measurement $\phi_m$ needs to be adjusted by the phase wind-up, but it is relatively insensitive to any error in the wind-up value because of the narrow wavelength. It is unnecessary to attempt to resolve the ambiguity on the measurement composition since it is used simply to smooth out the noise in the ambiguity resolved composite measurement from equation (2).

Figure 3:
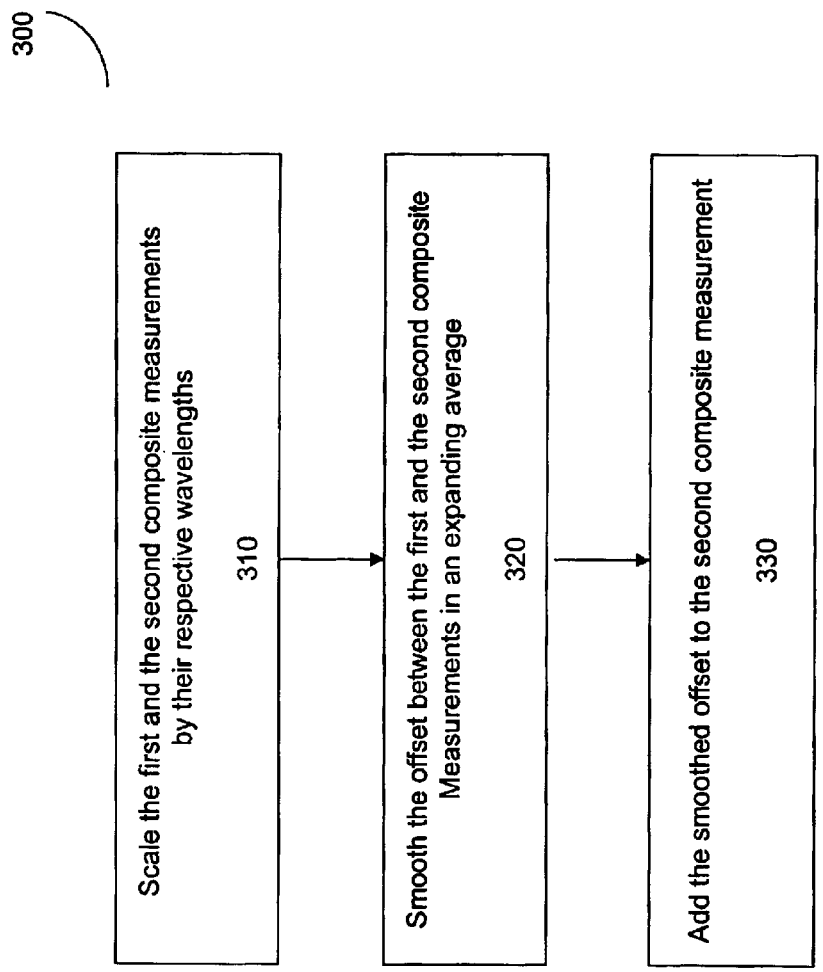
FIG. 3 is a flowchart illustrating a smoothing process used in the method for generating an ambiguity-resolved, refraction-corrected, and noise-minimized carrier-phase measurement.

FIG. 3 illustrates a smoothing process 300 in step 240. As shown in FIG. 3, process 300 includes step 310 in which the composite measurement $\phi_r$ of Equation (2) is scaled by its 3.4035 meter wavelength and the scaled composite measurement is designated by R, and the composite measurement $\phi_m$ in Equation (3) is scaled by its 10.8 centimeter wavelength and the scaled composite measurement is designated by S. Process 300 further includes step 320 in which an offset between R and S is computed at each of a plurality of measurement epochs and the offset is smoothed in an expanding average over the plurality of epochs. So in step 320, the following is iteratively computed over a number of measurement epochs $$O_k = O_{k-1} + \frac{1}{n}(R_k - S_k - O_{k-1}) \quad (4)$$

where k designates a measurement epoch and k−1 the measurement epoch prior to k, O represents the smoothed offset. n equals to k before k reaches a predetermined maximum number of averaging, and thereafter n is held at that maximum number.

To get the final smoothed output measurement, process 300 further includes step 330 in which the smoothed offset is added to the high-accuracy refraction corrected measurement S to arrive at an ambiguity-resolved, refraction-corrected, and noise-minimized composite measurement M $$M_k = O_k + S_k \quad (5)$$

The advantage of using steps 320 and 330 in process 300 for smoothing the ambiguity-resolved carrier-phase measurement is that the offset can be monitored for reasonableness during the smoothing process.

The number of measurement epochs over which Equation (4) is calculated is determined according to the square of the noise ratio, which is the ratio of the noise level in $\phi_r$ over the noise level in $\phi_m$. According to our examples above, this ratio would be about 50. So the square of the noise ratio according to our examples above would be about 2,500. However, the examples above assume independent random noise at each epoch, while the multipath is typically positively correlated over several minutes. This means that the averaging process can be profitably continued over 10,000 or more measurement epochs, or for 10,000 seconds or longer if a set of measurements are taken in every second. The averaging process is converted to an exponential average when a maximum number for the averaging as determined by the square of the noise ratio is reached.

Although the above embodiments of the present invention have been described in the context of GPS, the present invention is applicable to other positioning systems with slight modifications. For example, in the European Galileo System, a E6 carrier frequency at (125*10.23 MHz) is used in place of the L2 frequency. The technique of the embodiments as described above would work even better because the difference in frequency between E6 and L5 is twice as large as that between L2 and L5. Thus, in stead of the super combination in Equation (2), one can use the following super combination in the European Galileo System:

$$\phi_r = (\phi_1 - \phi_e + N_{1e}) - 2.165584416(\phi_e - \phi_5 + N_{e5}) \quad (6)$$

where subscript $\phi_e$ represents the carrier-phase measurement in the E6 frequency, $N_{1e}$ and $N_{e5}$ represent the whole-cycle ambiguities associated with the ($\phi_1-\phi_e$) and ($\phi_e-\phi_5$) measurement differences, respectively, and the value of 2.165584416 comes from the following calculation $$\frac{f_5(f_1-f_e)}{f_1(f_e-f_5)} = 2.165584416 \qquad 5$$

where $f_e$ stands for the frequency of E6. Since Equation (6) uses a much smaller value of 2.165584416 as compared to the value of 5.077923 in Equation (2), the noise amplification in the super combination in Equation (6) should be much less than the noise amplification in the super combination in Equation (2). Thus, the resultant ambiguity resolved, refraction corrected measurement combination will require less smoothing to achieve the same accuracy.

Thus, the present invention provides a method for resolving the ambiguities in a refraction-corrected carrier-phase composite measurement. The present invention also provides a method for minimizing the effect of the noise amplification in the composite measurement. It is believed that a very accurate refraction-corrected and ambiguity-resolved measurement process can enhance a number of GPS applications. For example, it may reduce or eliminate the distance constraints in the carrier-phase differential GPS, which is often referred to as Real-Time Kinematic (RTK) GPS.

Although the present invention has been described with respect to a few specific embodiments, it should be understood that various changes, substitutions, and alterations can be made hereto without departing from the spirit and scope of the invention as defined by the appended claims.

I claim:

1. A method for obtaining an ambiguity-resolved, refraction-corrected GPS carrier-phase measurement, comprising:

obtaining carrier-phase measurements on three carrier frequencies;

forming at least two wide-lane carrier phase measurements based on the carrier-phase measurements on the three carrier frequencies;

resolving whole-cycle ambiguities in the wide-lane carrier-phase measurements; and using the ambiguity-resolved wide-lane measurements to form the ambiguity-resolved, refraction-corrected GPS carrier-phase measurement.

2. The method of claim 1 wherein the three GPS frequencies include a first frequency, a second frequency frequency, and a third frequency, the wide-lane carrier phase measurements include a first wide-lane carrier-phase measurement formed using carrier-phase measurements on the first and the second frequencies and a second wide-lane carrier-phase measurement formed using carrier-phase measurements on the second and the third frequencies, and the ambiguity-resolved, refraction-corrected GPS carrier-phase measurement comprises a difference between the first wide-lane measurement and a multiple of the second wide-lane measurement.

3. The method of claim 1 wherein a ionospheric refraction error in the first wide-lane measurement is approximately equal to the ionospheric refraction error in the multiple of the second wide-lane measurement.

4. The method of claim 1 wherein the whole-cycle ambiguity in each wide-lane carrier-phase measurement is resolved based on a frequency-weighted average of corresponding GPS code measurements, an error caused by ionospheric refraction in the frequency-weighted average matching an error caused by ionospheric refraction in the wide-lane carrier-phase measurement.

5. A method for generating carrier-phase measurement, comprising:

forming a first composite measurement using GPS carrier-phase measurements on three GPS frequencies;

forming a second composite measurement using GPS carrier-phase measurements on at least two GPS carrier frequencies; and smoothing the first composite measurement with the second composite measurement.

6. The method of claim 5 wherein the first composite measurement is a linear combination of the GPS carrier-phase measurements on the three GPS carrier frequencies.

7. The method of claim 5 wherein the first composite measurement is ambiguity-resolved and forming the first composite measurement comprises:

obtaining carrier-phase measurements on the three frequencies;

forming at least two wide-lane carrier phase measurements based on the carrier-phase measurements on the three frequencies; and resolving whole-cycle ambiguities in the wide-lane carrier-phase measurements;

using the ambiguity-resolved wide-lane measurements to form the first composite measurement.

8. The method of claim 7 wherein the whole-cycle ambiguity in each wide-lane carrier-phase measurement is resolved based on a frequency-weighted average of corresponding GPS code measurements, an error caused by ionospheric refraction in the frequency-weighted average matching an error caused by ionospheric refraction in the wide-lane carrier-phase measurement.

9. The method of claim 5 wherein the second composite measurement is formed to have a small multi-path noise therein.

10. The method of claim 5 wherein the second composite measurement is formed using carrier-phase measurements on all of the three frequencies.

11. The method of claim 5 wherein the second composite measurement includes unresolved whole-cycle ambiguities.

12. The method of claim 5 wherein the second composite measurement has a wavelength of about 10.8 centimeters.

13. The method of claim 12 wherein the second composite measurement has a noise level of about 2.7 centimeters assuming equal phase-noise in each of the carrier-phase measurements on the three frequencies.

14. The method of claim 5 wherein the first and the second composite measurements are scaled by there respective wavelengths and wherein smoothing the first composite measurement with the second composite measurement comprises:

computing an offset between the first composite measurement and the second composite measurement at each of a plurality of measurement epochs;

smoothing the offset in an expanding average over the plurality of measurement epochs; and adding the smoothed offset to the second composite measurement to obtain an ambiguity-resolved, refraction-corrected, and noise reduced GPS carrier-phase measurement.

15. A positioning or navigation system, comprising:

a GPS receiver configured to obtain GPS code and carrier-phase measurements based on signals from a plurality of satellites in view of the GPS receiver, the signals being transmitted in three different carrier frequencies;

a computer system coupled to the GPS receiver, the computer system includes a processor and a memory coupled to the process, the memory storing therein program instructions, the program instructions comprising:

instructions for forming a first composite measurement using GPS carrier-phase measurements on the three carrier GPS frequencies;

instructions for forming a second composite measurement using GPS carrier-phase measurements on at least two GPS carrier frequencies; and instructions for smoothing the first composite measurement with the second composite measurement.

16. The positioning system of claim 15, wherein the instructions for forming the first composite measurement comprise:

instructions for forming at least two wide-lane carrier phase measurements based on the carrier-phase measurements on the three carrier frequencies;

instructions for resolving whole-cycle ambiguities in the wide-lane carrier-phase measurements; and instructions for using the ambiguity-resolved wide-lane measurements to form the first composite measurement.

17. The positioning system of claim 15 wherein the second composite measurement is formed to have a small multi-path noise therein.

18. The positioning system of claim 15 wherein the second composite measurement is formed using carrier-phase measurements on all of the three frequencies.

19. The positioning system of claim 15 wherein the second composite measurement includes unresolved whole-cycle ambiguities.

20. The positioning system of claim 15 wherein the instructions for smoothing the first composite measurement with the second composite measurement comprise:

instructions for computing an offset between the first composite measurement and the second composite measurement at each of a plurality of measurement epochs;

instructions for smoothing the offset in an expanding average over the plurality of measurement epochs; and instructions for adding the smoothed offset to the second composite measurement to obtain an ambiguity-resolved, refraction-corrected, and noise reduced GPS carrier-phase measurement.

* * * * *